United States Patent
Wang et al.

(10) Patent No.: US 11,057,299 B2
(45) Date of Patent: Jul. 6, 2021

(54) REAL-TIME VIDEO TRANSMISSION METHOD FOR MULTIPATH NETWORK

(71) Applicant: CATON TECHNOLOGY (SHANGHAI) LIMITED, Shanghai (CN)

(72) Inventors: Wang Wang, Shanghai (CN); Lei Huang, Shanghai (CN)

(73) Assignee: CATON TECHNOLOGY (SHANGHAI) LIMITED, Shanghai (CN)

(*) Notice: Subject to any disclaimer, the term of this patent is extended or adjusted under 35 U.S.C. 154(b) by 115 days.

(21) Appl. No.: 16/470,146

(22) PCT Filed: Dec. 15, 2016

(86) PCT No.: PCT/CN2016/110094
§ 371 (c)(1),
(2) Date: Jun. 14, 2019

(87) PCT Pub. No.: WO2018/107432
PCT Pub. Date: Jun. 21, 2018

(65) Prior Publication Data
US 2019/0394121 A1    Dec. 26, 2019

(51) Int. Cl.
*H04L 12/725* (2013.01)
*H04L 12/26* (2006.01)
(Continued)

(52) U.S. Cl.
CPC ........ *H04L 45/3065* (2013.01); *H04L 43/087* (2013.01); *H04L 43/16* (2013.01);
(Continued)

(58) Field of Classification Search
CPC .................................................. H04L 45/3065
See application file for complete search history.

(56) References Cited

U.S. PATENT DOCUMENTS 6,788,686 B1    9/2004   Khotimsky et al.
2010/0121971 A1*  5/2010  Shao ..................... H04N 21/816
                                                    709/231
(Continued)

FOREIGN PATENT DOCUMENTS

CN    101888664 A    11/2010
CN    103718532 A     4/2014
(Continued)

OTHER PUBLICATIONS

Jiyan Wu, Bo Cheng, Yanlei Shang, Jun Huang, Junliang Chen, "A novel scheduling approach to concurrent multipath transmission of high definition video in overlay networks", May 19, 2014, Journal of Network and Computer Applications, pp. 17-29. (Year: 2014).*
International Search Report of corresponding PCT Application No. PCT/CN2016/110094—5 pages (dated Aug. 30, 2017).
Extended European Search Report of corresponding European Patent Application No. 16923703.9—7 pages (dated Apr. 29, 2020).
Singh et al., "Multipath RTP (MPRTP): draft-singh-avtcore-MPRTP-10.txt", IETF—40 pages (Nov. 14, 2014).

*Primary Examiner* — Edan Orgad
*Assistant Examiner* — Won Tae C Kim
(74) *Attorney, Agent, or Firm* — Knobbe, Martens, Olson & Bear, LLP

(57) ABSTRACT

The present invention provides a real-time video transmission method for a multipath network. The multipath network comprises at least two video stream transmission sub-paths from a transmitting terminal to a receiving terminal. The real-time video transmission method for a multipath network comprises steps of: 1) by the transmitting terminal, packing original video stream data and sequentially adding a tag into a packet header to obtain multipath transmission data, and sending the multipath transmission data packets to different ones of the video stream transmission sub-paths for transmission; and, 2) by the receiving terminal, receiving and parsing the multipath transmission data packets, and restoring the original video data stream according to the tags in the packet headers. The present invention can take full advantage of outlet and inlet bandwidths at two ends of a trans- (Continued)

mission path, and can effectively improve stability in video transmission to improve user experience.

7 Claims, 2 Drawing Sheets

(51) Int. Cl.
    *H04L 12/707*     (2013.01)
    *H04L 12/741*     (2013.01)
    *H04L 12/801*     (2013.01)

(52) U.S. Cl.
    CPC ............ *H04L 45/24* (2013.01); *H04L 45/745* (2013.01); *H04L 47/34* (2013.01)

(56) References Cited

U.S. PATENT DOCUMENTS

2010/0124271 A1*   5/2010   Martz ................... H04N 19/137
                                                                                   375/240.01
2018/0034740 A1*   2/2018   Beliveau ................ H04L 47/28

FOREIGN PATENT DOCUMENTS

| CN | 106210598 A | 12/2016 |
|----|-------------|---------|
| CN | 106454414 A | 2/2017 |
| WO | 2012/170738 A1 | 12/2012 |

OTHER PUBLICATIONS

* cited by examiner

REAL-TIME VIDEO TRANSMISSION METHOD FOR MULTIPATH NETWORK

TECHNICAL FIELD

The present invention relates to the technical field of real-time data transmission, and in particular to a real-time video transmission method for a multipath network.

BACKGROUND

With the rapid development of the Internet, network real-time video transmission systems have been more and more widely used, for example, in live network broadcast of sports events, video conference systems, video communication tools and the like. In the prior art, real-time video transmission modes are generally classified into two categories:

one is a point-to-point transmission mode, in which a network connection is directly established between two terminals to realize video data transmission, wherein this mode is generally applied in video communication tools, such as FaceTime, Skype, etc.; the other is a streaming media server forwarding mode, in which a video transmitting terminal firstly establishes a connection with a media server to transmit video data to the media server, and then the media server transmits the video data to a video receiving terminal. This mode is generally applied in one-to-many application scenarios such as live network broadcast.

FIG. 1 shows a typical video transmission network topology, which mainly consists of four roles, i.e., a transmitting terminal, a receiving terminal, a streaming media server and a router each of which can be abstracted into a network node. A connection line between two nodes is called a network edge which indicates the network connection between the two nodes and a transmission direction of video data. The transmission capacity between two nodes is generally indicated by network bandwidth. The network bandwidth refers to the maximum amount of bit data passing from one terminal to another terminal within a fixed time (usually one second), and is generally expressed in bps whose full name is bits per second, i.e., a bit rate, and is the common unit of the data transmission rate.

In FIG. 1, the transmitting terminal represents a transmitter of the video data, the receiving terminal represents a receiver of the video data, the streaming media server is a network node that plays a role of transferring data in the streaming media server forwarding mode, and the router is a routing node that connects various networks and realizes signal transmission. In FIG. 1, R101, R111, R112, R121, R122, R123, R201 and the like are all routers.

In the point-to-point transmission scenario, data is usually transmitted from the transmitting terminal to the receiving terminal according to the rule of SHORTEST PATH FIRST. In the example shown in FIG. 1, in the point-to-point transmission mode, real-time video will be transmitted through a path of (the transmitting terminal→R101→R111→R112→R201→the receiving terminal). This path is referred to as P1 hereinafter. In the streaming media server forwarding mode, data is transmitted from the transmitting terminal to the streaming media server, i.e., through a path of (the transmitting terminal→R101→R121→R122→the streaming media server), and then forwarded from the streaming media server to the receiving terminal, i.e., through a path of (the streaming media server→R122→R123→R201→the receiving terminal). The two paths form a complete path from the transmitting terminal to the receiving terminal, which is referred to as P2 hereinafter.

Regardless of the point-to-point transmission mode or the streaming media server forwarding mode, the network bandwidth between the transmitting terminal and the receiving terminal is determined by the smallest network edge in the whole path. For example, in the network shown in FIG. 1, both the outlet bandwidth of the transmitting terminal and the inlet bandwidth of the receiving terminal reach 10 Mbps. However, the smallest network edge in the path P1 is (R111→R112) and the bandwidth of the network edge (R111→R112) is 2 Mbps, so the bandwidth of the path P1 is only 2 Mbps. The smallest network edge in the path P2 is (R121→R122) and the bandwidth of the network edge (R121→R122) is only 8 Mbps, so the bandwidth of the path P2 is only 8 Mbps. It can be known that, regardless of the conventional point-to-point transmission mode or the streaming media server forwarding mode, both the outlet bandwidth of the transmitting terminal and the inlet bandwidth of the receiving terminal cannot be utilized fully. Moreover, in the real Internet environment, the bandwidth in the network is shared by a large number of users, and these users may use some common network edges during data transmission. At certain moments, the data transmission capacity carried by these network edges will reach the limit, resulting in transmission network congestion and instability of data transmission. However, in real-time video transmission applications, this instability will lead to video buffering or video mosaic, which will seriously affect the user experience.

Therefore, at present, there is an urgent need for a real-time video transmission solution which can take full advantage of the outlet bandwidth and the inlet bandwidth and can effectively improve the transmission stability.

SUMMARY

Therefore, an objective of the present invention is to provide a real-time video transmission solution that can overcome the above deficiencies.

The present invention provides a real-time video transmission method for a multipath network, wherein the multipath network includes at least two video stream transmission sub-paths from a transmitting terminal to a receiving terminal, and the real-time video transmission method for a multipath network includes the following steps of:

1) by the transmitting terminal, packing original video stream data and sequentially adding a tag into a packet header to obtain multipath transmission data, and sending the multipath transmission data packets to different ones of the video stream transmission sub-paths for transmission; and 2) by the receiving terminal, receiving and parsing the multipath transmission data packets, and restoring the original video data stream according to the tags in the packet headers.

The video stream transmission sub-paths include a transmission sub-path connected in a point-to-point transmission mode and a transmission sub-path connected in a transfer service mode.

In the step 1), the packet header of the multipath transmission data packet includes video transmission sub-path ID, and the transmitting terminal allocates the amount of data transmitted to different video transmission sub-paths by setting the video transmission sub-path ID.

In the step 1), the transmitting terminal proportionally allocates the transmission task amount of each of the video transmission sub-paths according to historical bandwidth data of different video transmission sub-paths.

In the step 1), the packet header of the multipath transmission data packet further includes: a sequence number of the multipath transmission data packet in a sub-path, a total sequence number of the multipath transmission data packet, an IP address of a next station, and an IP address and a port of the receiving terminal.

In the step 1), the transmitting terminal dynamically adjusts the transmission task amount of each of the video transmission sub-paths according to real-time measured bandwidths of the video transmission sub-paths.

In the step 1), the packet header of the multipath transmission data packet further includes: a local timestamp.

In the step 1), the transmission sub-path directly connected in the point-to-point transmission mode is used as the major sub-path, and the number $N_0$ of multipath transmission data packets to be transmitted per second by the major sub-path is:

$$N_0 = \frac{SBR_0}{8 \times PS},$$

where PS is the size of a single multipath transmission data packet, and $SBR_0$ is the current bandwidth of the major sub-path.

In the step 1), for other sub-paths except for the major sub-path, the number $N_i$ of multipath transmission data packets to be transmitted per second is:

$$N_i = \frac{SBR_i}{\sum_{j=1}^{n} SBR_j}(M - N_0),$$

where i is the video transmission sub-path ID, $SBR_i$ is the current bandwidth of the $i^{th}$ video transmission sub-path, M is the number of to-be-transmitted transmission data packets generated per second, and n is the number of other video transmission sub-paths except for the major sub-path.

The step 2) further includes: by the receiving terminal and according to the timestamp carried in the received multipath transmission data packet and the receiving time of the multipath transmission data packet, calculating the bandwidth of a corresponding video transmission sub-path, and feeding the bandwidth of the corresponding video transmission sub-path back to the transmitting terminal.

The step 2) further includes: after calculating the bandwidth of the corresponding video transmission sub-path, by the receiving terminal, establishing a feedback information data packet carrying the calculated bandwidth information, and transmitting the feedback information data packet back to the transmitting terminal.

In the step 2), a method for calculating the bandwidth of a video transmission sub-path includes:

21) for any one of the video transmission sub-paths, calculating, by the receiving terminal, an average receiving time jitter DJ of multipath transmission data packets in a sliding time window;

22) when the DJ is less than a threshold $DJ_{thres}$, increasing the bandwidth of the video transmission sub-path; and 23) when the DJ is greater than the threshold $DJ_{thres}$, decreasing the bandwidth of the video transmission sub-path.

The step 21) further includes: for any one of the video transmission sub-paths, maintaining, by the receiving terminal, receiving time jitters $\{J_0, \ldots J_i, \ldots J_N\}$ of all multipath transmission data packets in the sliding time window, where $J_i$ represents the receiving time jitter of the $i^{th}$ multipath transmission data packet in the video transmission sub-path in the sliding time window and N represents the number of multipath transmission data packets in the video transmission sub-path received in the sliding time window; and, calculating the average receiving time jitter DJ:

$$DJ = \sqrt{\frac{1}{N}\sum_{i=0}^{N}(J_i - AJ)^2},$$

$$AJ = \frac{1}{N}\sum_{i=0}^{N}J_i;$$

in the step 22), when the DJ is less than the threshold $DJ_{thres}$, the bandwidth is increased by a certain percentage on the basis of the bandwidth calculated in a previous time window; and in the step 23), when the DJ is greater than the threshold $DJ_{thres}$, the bandwidth $R_{new}$ is updated as:

$$R_{new} = R * \left(1 - \frac{L * TW}{RBUF - TW}\right),$$

where R is the bandwidth calculated in the previous time window, TW is the time length of the sliding time window, RBUF represents the maximum buffer time of the receiving terminal, and $$L = \frac{NLP}{NLP + NRP},$$

where NLP is the sum of lost packets in the current sliding time window and NRP is the sum of data packets received in the current sliding time window.

Compared with the prior art, the present invention has the following technical effects:

1. the present invention can take full advantage of outlet and inlet bandwidths at two ends of a transmission path; and 2. the present invention can effectively improve the stability in video transmission to improve user experience.

BRIEF DESCRIPTION OF THE DRAWINGS

The embodiments of the present invention will be described below in detail with reference to the accompanying drawings, in which.

DETAILED DESCRIPTION OF THE PRESENT INVENTION

In accordance with an embodiment of the present invention, a real-time video transmission method for a multipath network is provided. The multipath network is a video transmission network having at least two transmission paths from a transmitting terminal to a receiving terminal. In this embodiment, a plurality of paths are simultaneously used to complete video transmission, so that the utilization of outlet and inlet bandwidths at two ends of a transmission path is increased and the stability in video transmission is effectively improved.

Figure 1:
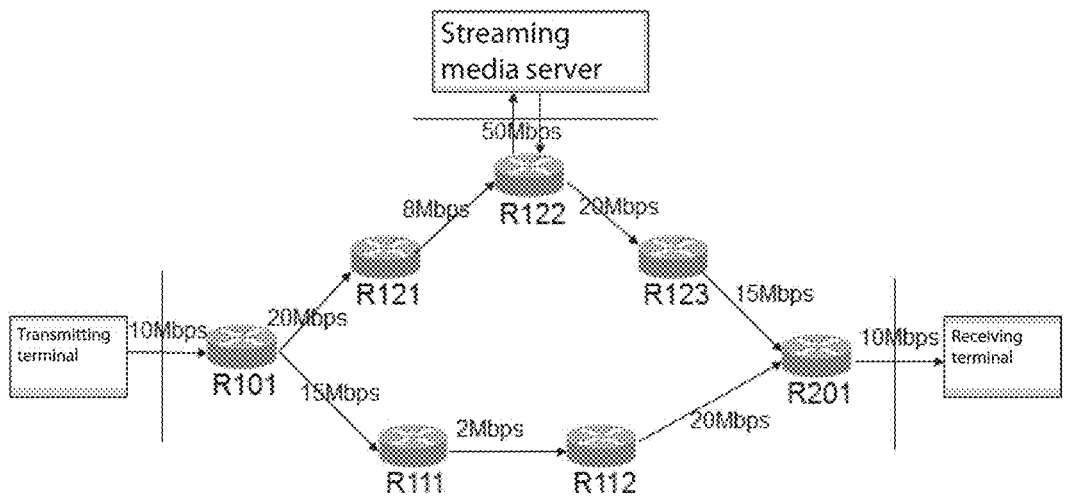
FIG. 1 shows a typical video transmission network topology.

In the video transmission network topology shown in FIG. 1, there is a path P1 supporting the point-to-point transmission mode and a path P2 supporting the streaming media server forwarding mode between the transmitting terminal and the receiving terminal. Therefore, the video transmission network topology shown in FIG. 1 can directly constitute a multipath network required in this embodiment. In this embodiment, the streaming media server in FIG. 1 is replaced with a forwarding server specifically used for realizing a video forwarding function. Of course, since the streaming media server itself has a video forwarding function, the original streaming media server can also be reserved and directly used as a special forwarding server.

Figure 2:
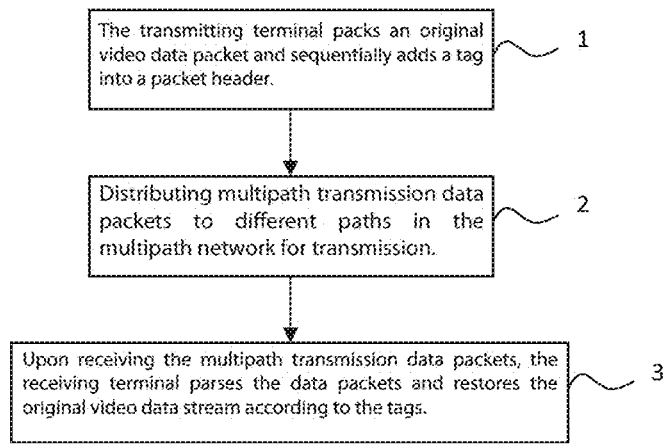
FIG. 2 shows a flowchart of a real-time video transmission method for a multipath network according to an embodiment of the present invention.

In the multipath network, if it is required to simultaneously use a plurality of paths to complete video transmission, data from the transmitting terminal is to be distributed to the plurality of paths for transmission. FIG. 2 shows a flowchart of the real-time video transmission method for a multipath network in this embodiment. As shown in FIG. 2, the real-time video transmission method includes the following steps.

Step 1: The transmitting terminal packs original video stream data and sequentially adds a tag into a packet header. Generally, the video stream data is transmitted in a transport layer, so the original video stream data is divided into data segments of a certain size, and each data segment is packed in a fixed format and sequentially tagged to form a data packet. For ease of description, in the present invention, the data packet obtained after packing the original video data stream is referred to as a multipath transmission data packet.

In an embodiment, the data format of the packet header of the multipath transmission data packet is shown in Table 1.

TABLE 1

| Domain | Length (the number of bits) | Description |
|---|---|---|
| MagicNumber | 24 | 'MPP' |
| ChannelID | 8 | Identifier of a sub-path, wherein the identifier of the sub-path directly established between two terminals is 0. |
| SubSequenceNo | 16 | Sequence number of a data packet in each sub-path, in a cycle from 0 to 0xFFFF. |
| MajorSequenceNo | 16 | Total sequence number of the data packet, in a cycle from 0 to 0xFFFF. |

TABLE 1-continued

| Domain | Length (the number of bits) | Description |
|---|---|---|
| SessionID | 32 | Unique identifier of a session, used for distinguishing different video transmission sessions. |
| Timestamp | 32 | Local timestamp when the data packet is transmitted. |
| NextHopAddr | 32 | IP address of a next station, wherein, if a sub-path is a path passing through transfer servers, this domain is firstly filled with the address of a transfer server, and after reaching the transfer server, this domain is modified into the address of a next transfer server; this domain is the same as DestinationAddr (i.e., the address of the final destination) at the last station. |
| DestinationAddr | 32 | IP address of the final destination, i.e., IP address of the receiving terminal. |
| DestinationPort | 16 | Port of the final destination. |

MagicNumber is used for identifying multipath transmission data packets to avoid parsing errors at the receiving terminal when there are invalid data packets in the network. ChannelID is the ID of a transmission sub-path to be used for a multipath transmission data packet. SubSequenceNo is the sequence number of a multipath transmission data packet in each sub-path, which increases progressively according to the number of data packets in this sub-path. MajorSequenceNo is a total sequence number of a multipath transmission data packet, which increases progressively according to the number of data segments of the original video data stream. In this embodiment, MajorSequenceNo is actually the tag sequentially added into the packet header as described above. At the receiving terminal, the original video stream can be restored by using this tag. SessionID is a unique identifier of a session and used for distinguishing different video transmission sessions. Timestamp is the current system time, i.e., the local timestamp when the multipath transmission data packet is transmitted. NextHopAddr is the IP address of the next station. If a sub-path is a path passing through transfer servers, NextHopAddr is firstly filled with the address of a transfer server, and after reaching the transfer server, the transfer server will modify this domain into the address of a next transfer server, until the last station is reached. At the last station, the domain NextHopAddr is the same as the address of the final destination address, i.e., DestinationAddr. DestinationAddr is the IP address of the final destination, i.e., the IP address of the receiving terminal. DestinationPort is the port of the final destination, i.e., the port of the receiving terminal used for receiving the multipath transmission data packet.

Step 2: The multipath transmission data packets are distributed to different paths in the multipath network for transmission. Generally, since the video data is transmitted in a transport layer, in this embodiment, the multipath transmission data packet is transmitted by a transport layer protocol. The transport layer protocol may be a TCP protocol or a UDP protocol. In this step, the video data can be sent to different sub-paths based on the ChannelID of the multipath transmission data packet, so as to realize distributed transmission of the video data. During the transmission process, if a point-to-point sub-path is used, the multipath transmission data packets can be directly transmitted to the receiving terminal in the existing point-point transmission mode. If a transfer service sub-path is used, after each transfer server receives the data packet, it is only necessary to change the domain NextHopAddr of the multipath transmission data packet into the IP address of the next station and then forward the multipath transmission data packet to the next station, until reaching the destination address, i.e., the receiving terminal.

Step 3: Upon receiving the multipath transmission data packets, the receiving terminal parses the data packets and then restores the original video data stream according to the tags. In this step, the receiving terminal can separately verify the data integrity of each sub-path according to the domain SubSequenceNo of the multipath transmission data packet, and then successively restore the video data into the original sequence according to the MajorSequenceNo of each multipath transmission data packet so as to form video stream data.

In an embodiment, the initialization process of the multipath network is as follows. At the transmitting terminal, the address of the transfer server for the next station is configured by a user. At the transfer server, the address of the transfer server for the next station is configured for each video stream by using the combination of the IP address and port of the final destination as an index. The transmitting terminal firstly establishes, with the receiving terminals, a direct sub-path having an identifier ChannelID of 0 between the two terminals, and SessionID is randomly generated at the same time. This direct sub-path is hereinafter referred to as a major sub-path. Subsequently, the connection with each user-configured transfer server for the next station is established, ChannelID is successively accumulated to form a number of transfer service sub-paths, thus completing the initialization of the multipath network. Of course, the present invention is not limited to the above initialization method. For example, in another embodiment, the address of the transfer server for the next station is not configured by the user, but is automatically acquired by a central server. In still another embodiment, the transmitting terminal automatically acquires the address of the transfer server for the next station after performing an initial bandwidth test. No manner what initialization method is used in the multipath network, the ultimate purpose is to generate a plurality of sub-paths for data transmission.

During packing, the transmitting terminal controls video data transmission sub-paths by allocating different ChannelIDs for different original video data segments. In this way, the allocation of the amount of transmission data on different sub-paths can be realized as long as the ChannelID is allocated proportionally. In an embodiment, the transmission task amount of each sub-path, i.e., the number of multipath transmission data packets to be transmitted in a time unit by each sub-path, can be proportionally allocated according to historical bandwidth data of different sub-paths.

In another embodiment, the transmission task amount of each sub-path is dynamically adjusted according to the real-time measured bandwidth. In this way, the bandwidth of each sub-path can be utilized more efficiently, and the stability of video transmission can be further improved. In this embodiment, the allocation algorithm for the task amount of each sub-path is as follows: if it is assumed that the encoding rate set at the transmitting terminal by the user is TBR bps, the bandwidth of each sub-path is $SBR_i$, where i is the ChannelID of the sub-path and n is the total number of sub-paths except for the major sub-path, the number of video data packets generated per second is $$M = \frac{TBR}{8 \times PS},$$

where PS is the size of a single multipath transmission data packet in unit of byte and generally takes a fixed value. If $N_i$ represents the number of multipath transmission data packets to be transmitted per second by the $i^{th}$ sub-path, the number of multipath transmission data packets to be transmitted by the major sub-path per second is:

$$N_0 = \frac{SBR_0}{8 \times PS}.$$

The number of multipath transmission data packets to be transmitted by each of the remaining sub-paths per second is:

$$N_i = \frac{SBR_i}{\sum_{j=1}^{n} SBR_j}(M - N_0).$$

In the step 1, the transmitting terminal allocates multipath transmission data packets to each sub-path in turn, and counts the multipath transmission data packets that have been transmitted by each sub-path per second. When the count is equal to the number of multipath transmission data packets to be transmitted within this second (i.e., $N_i$), the transmitting terminal stops allocating multipath transmission data packets to this sub-path until the next second starts.

Furthermore, in a preferred embodiment, a scheme for acquiring the bandwidth of each sub-path and dynamically adjusting the transmission task amount of each sub-path is further provided. The receiving terminal calculates the bandwidth of a corresponding sub-path according to the timestamp carried in the received multipath transmission data packet and the receiving time of the multipath transmission data packet. Then, the receiving terminal generates a feedback information data packet at a fixed time interval, and transmits the feedback information data packet back to the transmitting terminal through the major sub-path.

The format of the feedback information data packet is shown in Table 2.

TABLE 2

| Domain | Length (the number of bits) | Description |
|---|---|---|
| MagicNumber | 24 | 'ACK' |
| Version | 8 | Version number information. |
| ACKNo | 16 | Sequence number of the feedback packet, in a cycle from 0 to 0xFFFF. |
| Type | 8 | Type of the Payload. When Type is 0, payload represents the estimated bandwidth of the sub-path. |
| ChannelID | 8 | Identifier of the sub-path. |
| Length | 32 | Length of Payload. |
| Payload | Length | Feedback information load. When Type is 0, payload represents the estimated bandwidth of the sub-path. |

MagicNumber is used for identifying the feedback data packet. Verion is the version number information. ACKNo is the sequence number of the feedback packet. Type represents the type of Payload. In an example, when Type is 0, payload represents the estimated bandwidth of the sub-path. ChannelID represents the identifier of the sub-path. Length represents the length of Payload. Payload represents the feedback information load. In the feedback information data packet, Payload carries the estimated bandwidth of the sub-path. The four domains, i.e., Type, ChannelID, Length and Payload, are combined to form feedback information of a single sub-path. The four domains may appear in the same feedback information data packet repeatedly, that is, one feedback information data packet may contain feedback information of a plurality of sub-paths.

In this preferred embodiment, the initial value of $N_0$ is set as M. After the bandwidth calculation feedback information of the major sub-path fed back by the receiving terminal each time is received, $N_0$ is updated according to the fed-back bandwidth, and the value of $N_i$ is set as:

$$N_i = \frac{SBR_i}{\sum_{j=1}^{n} SBR_j}(M - N_0),$$

where i=[1,n].

In the step 1, in the packing stage, a corresponding number of multipath transmission data packets are allocated to a corresponding sub-path according to the current values of $N_0$ and $N_i$, thus realizing the distributed transmission of the video data.

Figure 3:
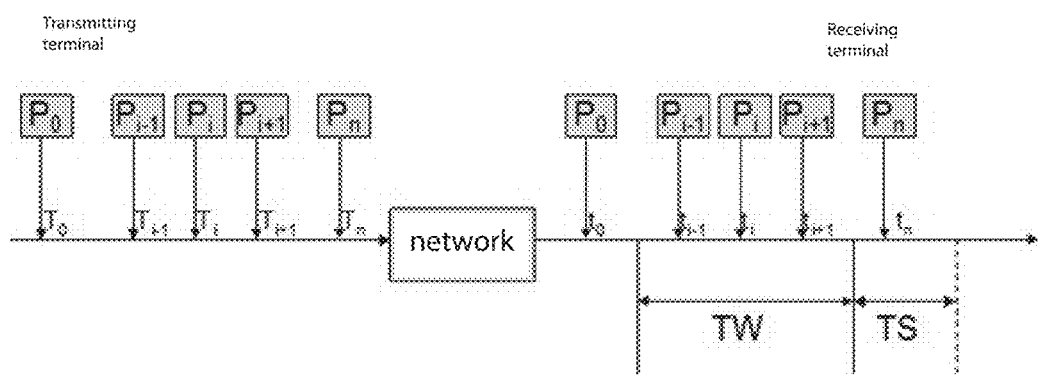
FIG. 3 shows a schematic diagram of a transmission process of multipath transmission data packets in a single sub-path on a time axis according to an embodiment of the present invention.

Further, in a preferred embodiment, a method for dynamically calculating the network bandwidth of each path by the receiving terminal is further provided. FIG. 3 shows a schematic diagram of a transmission process of multipath transmission data packets in a single sub-path on a time axis according to an embodiment of the present invention. In FIG. 3, i represents the serial number of a multipath transmission data packet in a sub-path; $T_i$ represents the transmitting time of the multipath transmission data packet $P_i$, where this time value is the local time of the transmitting time of this packet recorded by the transmitting terminal and transmitted by the domain Timestamp in the packet header; $t_i$ represents the receiving time of $P_i$, where this time value is the local time of the receiving time of this packet recorded by the receiving terminal; TW represents a siding time window (in time unit of ms), where, in this embodiment, the value of the sliding time window TW is a half or ¼ of the maximum receiving buffer time; and, TS represents the update interval for data statistics of the sliding time window, and the value of TS is generally TW/2.

The receiving terminal maintains receiving time jitters $J_i$ of all packets in the sliding time window TW, where $J_i=(t_i-t_0)-(T_i-T_0)$. If it is assumed that the number of packets received in a certain TW time period is N, the receiving time jitter in this window is recorded by $\{J_0, \ldots J_i, \ldots J_N\}$, then:

$$DJ = \sqrt{\frac{1}{N}\sum_{i=0}^{N}(J_i - AJ)^2},$$

$$AJ = \frac{1}{N}\sum_{i=0}^{N} J_i.$$

It is assumed that R is the current receiving rate of the sub-path, where $$R = \frac{1000}{TW}\sum_{i=0}^{N} S_i;$$

and $S_i$ represents the data amount of the multipath transmission data packet $P_i$.

When DJ is less than a threshold $DJ_{thres}$ (the value of which is generally $\sqrt{TW/2}$), the bandwidth of this sub-path is increased by 10% and updated to 1.1 times of R, where R is the bandwidth calculated in a previous time window.

When DJ is greater than the threshold $DJ_{thres}$, the bandwidth of this sub-path is updated to $$R_{new} = R * \left(1 - \frac{L * TW}{RBUF - TW}\right),$$

where L represents the ratio of lost packets in this time window. If it is assumed that the sum of lost packets in this time window is NLP and the sum of received data packets is NRP, then $$L = \frac{NLP}{NLP + NRP}.$$

RBUF represents the maximum buffer time of the receiving terminal, and the value of RBUF may be generally set as a configuration parameter of the receiving terminal by the user.

It is to be noted that the method for calculating the real-time bandwidth of the sub-path is not to limit the present invention, and the bandwidth of the sub-path may also be dynamically obtained by other methods.

In the foregoing embodiments, the transmitting terminal uses a point-to-point sub-path directly established between two terminals as major preferred transmission channel. If this sub-path has insufficient bandwidth to transmit the actual video code rate, the rest of the data will be transmitted by other sub-paths established by a transfer server. The advantage of this mechanism is that the bandwidth resources of the point-to-point sub-path can be utilized to the largest extent, the data flow of the transfer server can be reduced and the overall transmission cost can be reduced.

With the present invention, the influence from other intermediate networks in the existing video transmission methods can be avoided, and the stability of video transmission can be improved. In most cases, the video transmission rate between two terminals can be increased, thereby improving the video quality, particularly the stability of video transmission.

In an actual test, 8 Mbps of video is transmitted from Taiwan to the program production center in the Holland through the Internet. The uplink bandwidth in Taiwan and the downlink bandwidth in Holland are both 50 Mbps, but only 3 Mbps of video can be directly transmitted by the bandwidth from Taiwan to Holland using the point-to-point mode in the existing single-path transmission method; and only 6 Mbps of video can be transmitted from Taiwan to the server in Hong Kong and then to Holland. Moreover, in both methods, the transmission will be interrupted due to network congestion at different time points. However, with the technical solutions of the present invention, 8 Mbps of video can be stably transmitted using two paths for simultaneous transmission.

Finally, it is to be noted that the foregoing embodiments are merely used for describing the technical solutions of the present invention, rather than limiting the technical method. In terms of applications, the present invention can be extended to other modifications, alterations, applications and embodiments. Therefore, all the modifications, alterations, applications and embodiments shall be regarded as falling into the spirit and teaching scope of the present invention.

What is claimed is:

1. A real-time video transmission method for a multipath network, the multipath network comprising at least two video stream transmission sub-paths from a transmitting terminal to a receiving terminal, the real-time video transmission method for a multipath network comprising the following steps of:
   1) by the transmitting terminal, transmitting an original video stream data in a transport layer, so the original video stream data is divided into data segments of a certain size, and each data segment is packed in a fixed format and sequentially adding a tag into a packet header to form a multipath transmission data packet, and sending multipath transmission data packets to different ones of the video stream transmission sub-paths for transmission; wherein the packet header of each multipath transmission data packet includes an identifier of a transmission sub-path to be used for the multipath transmission data packet, a sequence number of the multipath transmission data packet in the transmission sub-path which increases progressively according to the number of data packets in the transmission sub-path, a total sequence number of the multipath transmission data packet, which increases progressively according to the number of data segments of the original video data stream;
   2) by the receiving terminal, receiving and parsing the multipath transmission data packets, and restoring the original video data stream according to the total sequence number in the packet header of each multipath transmission data packet; and
   wherein the video stream transmission sub-paths comprise a transmission sub-path connected in a point-to-point transmission mode and a transmission sub-path connected in streaming media server forwarding mode, and in the streaming media server forwarding mode, a video transmitting terminal firstly establishes a connection with a media server to transmit video data to the media server, and then the media server transmits the video data to a video receiving terminal; and
   wherein in the step 1):
   the transmitting terminal allocates the amount of data transmitted to different video transmission sub-paths by setting the identifier of the video transmission sub-path,
   the transmitting terminal dynamically adjusts the amount of data transmitted to each of the video transmission sub-paths according to real-time measured bandwidths of the video transmission sub-paths,
   the transmission sub-path directly connected in the point-to-point transmission mode is used as a major sub-path, and the number $N_0$ of multipath transmission data packets to be transmitted per second by the major sub-path is;

$$N_0 = \frac{SBR_0}{8 \times PS},$$

where PS is the size of a single multipath transmission data packet, and $SBR_0$ is the current bandwidth of the major sub-path,
for other sub-paths except for the major sub-path, the number $N_i$ of multipath transmission data packets to be transmitted per second is;

$$N_i = \frac{SBR_i}{\sum_{j=1}^{n} SBR_j}(M - N_0),$$

where i is the identifier of the video transmission sub-path, $SBR_i$ is the current bandwidth of the $i^{th}$ video transmission sub-path, M is the number of to-be-transmitted transmission data packets generated per second, and n is the number of other video transmission sub-paths except for the major sub-path.

2. The real-time video transmission method for a multipath network according to claim 1, characterized in that, in the step 1), the transmitting terminal proportionally allocates the amount of data transmitted to each of the video transmission sub-paths according to historical bandwidth data of different video transmission sub-paths.

3. The real-time video transmission method for a multipath network according to claim 1, characterized in that, in the step 1), the packet header of the multipath transmission data packet further comprises: an IP address of a next station, an IP address and a port of the receiving terminal, and a local timestamp.

4. The real-time video transmission method for a multipath network according to claim 1, characterized in that the step 2) further comprises: by the receiving terminal and according to the timestamp carried in the received multipath transmission data packet and the receiving time of the multipath transmission data packet, calculating the bandwidth of a corresponding video transmission sub-path, and feeding the bandwidth of the corresponding video transmission sub-path back to the transmitting terminal.

5. The real-time video transmission method for a multipath network according to claim 4, characterized in that the step 2) further comprises: after calculating the bandwidth of the corresponding video transmission sub-path, by the receiving terminal, establishing a feedback information data packet carrying the calculated bandwidth information, and transmitting the feedback information data packet back to the transmitting terminal.

6. The real-time video transmission method for a multipath network according to claim 5, characterized in that, in the step 2), calculating the bandwidth of a corresponding video transmission sub-path comprises:
   21) for any one of the video transmission sub-paths, calculating, by the receiving terminal, an average receiving time jitter DJ of multipath transmission data packets in a sliding time window;
   22) when the DJ is less than a threshold $DJ_{thres}$, increasing the bandwidth of the video transmission sub-path; and
   23) when the DJ is greater than the threshold $DJ_{thres}$, decreasing the bandwidth of the video transmission sub-path.

7. The real-time video transmission method for a multipath network according to claim 6, characterized in that the step 21) further comprises: for any one of the video transmission sub-paths, maintaining, by the receiving terminal, receiving time jitters $\{J_0, \ldots J_i, \ldots J_N\}$ of all multipath transmission data packets in the sliding time window, where $J_i$ represents the receiving time jitter of the $i^{th}$ multipath transmission data packet in the video transmission sub-path in the sliding time window and N represents the number of multipath transmission data packets in the video transmission sub-path received in the sliding time window; and, calculating the average receiving time jitter DJ:

$$DJ = \sqrt{\frac{1}{N}\sum_{i=0}^{N}(J_i - AJ)^2},$$

$$AJ = \frac{1}{N}\sum_{i=0}^{N}J_i;$$

in the step 22), when the DJ is less than the threshold $DJ_{thres}$, the bandwidth is increased by a certain percentage on the basis of the bandwidth calculated in a previous time window; and in the step 23), when the DJ is greater than the threshold $DJ_{thres}$, the bandwidth $R_{new}$ is updated as:

$$R_{new} = R*\left(1 - \frac{L*TW}{RBUF - TW}\right),$$

where R is the bandwidth calculated in the previous time window, TW is the time length of the sliding time window, RBUF represents the maximum buffer time of the receiving terminal, and $$L = \frac{NLP}{NLP + NRP},$$

where NLP is the sum of lost packets in the current sliding time window and NRP is the sum of data packets received in the current sliding time window.

* * * * *